(12) United States Patent
Chou et al.

(10) Patent No.: US 7,272,026 B2
(45) Date of Patent: *Sep. 18, 2007

(54) POWER CONVERTER FOR A HYBRID POWER FILTER

(75) Inventors: Hung-Liang Chou, Kaohsiung (TW); Chin-Chang Wu, Kaohsiung (TW); Wen-Pin Hsu, Kaohsiung (TW); Yao-Jen Chang, Kaohsiung (TW)

(73) Assignee: UIS Abler Electronics Co., Ltd., Hsintien, Taipei Hsien (TW)

( * ) Notice: Subject to any disclaimer, the term of this patent is extended or adjusted under 35 U.S.C. 154(b) by 301 days.

This patent is subject to a terminal disclaimer.

(21) Appl. No.: 11/044,025

(22) Filed: Jan. 28, 2005

(65) Prior Publication Data

US 2005/0207197 A1 Sep. 22, 2005

(30) Foreign Application Priority Data

Mar. 18, 2004 (TW) ................ 93107327 A

(51) Int. Cl.
*H02M 7/537* (2006.01)

(52) U.S. Cl. .............. 363/131; 323/207; 323/205

(58) Field of Classification Search ............... 363/39, 363/40, 41, 131, 132; 307/105, 106, 98, 307/9; 323/205, 207
See application file for complete search history.

(56) References Cited

U.S. PATENT DOCUMENTS

| 5,321,598 | A |   | 6/1994  | Moran                       |
|-----------|---|---|---------|-----------------------------|
| 5,465,203 | A | * | 11/1995 | Bhattacharya et al. 363/40  |
| 5,567,994 | A |   | 10/1996 | Davis et al.                |
| 5,731,965 | A | * | 3/1998  | Cheng et al. ........ 363/41 |
| 5,757,099 | A | * | 5/1998  | Cheng et al. ....... 307/105 |
| 5,977,660 | A |   | 11/1999 | Mandalakas et al.           |
| 6,982,546 | B2| * | 1/2006  | Wu et al. ........... 323/205 |
| 7,091,704 | B2| * | 8/2006  | Chou et al. ........ 323/207 |

* cited by examiner

*Primary Examiner*—Patrick Assouad
*Assistant Examiner*—Emily P Pham
(74) *Attorney, Agent, or Firm*—Bacon & Thomas, PLLC

(57) ABSTRACT

A power converter for a hybrid power filter includes a power electronic switch set and a DC capacitor. The power converter permits a power line of a power system to directly connect or connect through the passive power filter to a positive or a negative terminal of the DC capacitor of the power converter for free control of the power electronic switches. Consequently, the power converter has a structural configuration that reduces the number of power electronic switches, which can reduce manufacturing costs.

11 Claims, 4 Drawing Sheets

POWER CONVERTER FOR A HYBRID POWER FILTER

BACKGROUND OF THE INVENTION

1. Field of the Invention

The present invention relates to a power converter for a hybrid power filter. More particularly, the present invention relates to a hybrid power filter for filtering harmonic current which is generated from a single-phase power system, a three-phase, three-wire power system or a three-phase, four-wire power system.

2. Description of the Related Art

Recently, the characteristics of power electronic devices have been improved significantly. The power electronic devices with features of high-voltage rating, high-current rating, and high switching speed have been developed due to the improvement of semiconductor manufacturing technique. Power electronic devices are widely applied in electric power facilities, such as an uninterruptible power supply, motor driver, arc furnace, trolley car, battery charger, and lighting appliance etc. These electric power facilities may generate a large amount of harmonic current due to the nonlinear input characteristic of such loads. The harmonic current will pollute the power system and results in serious problems such as transformer overheat, rotary machine vibration, degrading voltage quality, electric power components destruction, medical equipment malfunction etc.

In order to improve the problems of harmonic pollution effectively, many harmonic control standards, such as IEEE519-1992, IEC1000-3-5, and IEC1000-3-4 etc., have been established by international research centers. In Taiwan, Taiwan Power Company has established a power control provisional standard for harmonic currents. How to solve the harmonic problems is an important topic in today's power system worldwide.

Conventionally, the passive power filter is used to solve the problem of harmonics. The passive power filter generally consists of inductors and AC capacitors. However, the passive power filter causes the problems of resonance and neighboring harmonic current injection that may destroy the passive power filter. Additionally, it is quite hard to obtain a better filtering effect of the passive power filter due to system reactance that may affect the filtering characteristic of the passive power filter.

Many other solutions for the harmonic problem are disclosed in the prior art, such as U.S. Pat. Nos. 5,977,660 and 5,321,598. Referring initially to FIG. 1, which illustrates a schematic circuitry of a conventional active power filter, a power source 1 supplies three-phase electric power to a load 3 with which to connect the active power filter 8 in parallel. The active power filter 8 includes at least one filtering inductor 80, a bridge power converter 81 and a DC capacitor 82. In order to filter the harmonic current generated from the load 3, the active power filter 8 provides a compensation current and injects it into the power line to filter the harmonic current of the load 3. Although the active power filter 8 performs a better filter characteristic, the capacity of the power converter 81 of the active power filter 8 must be greater than the product of the harmonic current of the load 3 and the voltage of the power source 1. Therefore, the capacity and manufacture cost of the power converter 81 of the active power filter 8 must be significantly increased, which limits the wide application of the active power filter 8.

A hybrid power filter has been developed to solve the problems of the passive power filter and the active power filter, as disclosed in U.S. Pat. Nos. 5,567,994 and 5,731,965. Referring to FIG. 2, which illustrates a schematic circuitry of a conventional hybrid power filter. A hybrid power filter consists of a passive power filter 90 and a power converter 91. In operation, the passive power filter 90 is used to lower the capacity of the power converter 91 while the power converter 91 is used to improve the filter characteristic of the passive power filter 90. Advantageously, the power converter 91 can solve problems of resonance and neighboring harmonic current injection caused by the passive power filter 90. Consequently, the hybrid power filter is suitably to a greater capacity of nonlinear load for filtering harmonics.

On account of the disadvantages of the passive power filter and the active power filter, a number of techniques of the hybrid power filters have been applied to a three-phase, three-wire power system described in patents, such as U.S. Pat. Nos. 5,567,994 and 5,731,965. The power converter of the three-phase, three-wire power system employs a three-phase bridge structure and three arms thereof. The three-phase three-arm bridge structure totally employs six power electronic switches and each arm is configured a pair of power electronic switches.

However, there is a need for reducing the number of arms of the three-phase bridge structure to save the manufacture cost. To accomplish this task, a half-bridge power converter is provided. Conventionally, a pair of serially connected capacitors of the half-bridge power converter substitutes for the power electronic switches of one arm of the power converter.

The present invention intends to provide a power converter for a hybrid power filter applied to a single-phase power system, a three-phase, three-wire power system or a three-phase, four-wire system. The power converter has one less arm than the conventional power converter and one less pair of power electronic switches. A power line from the power system directly connects to a DC side of the power converter or through the passive power filter to a DC side of the power converter to reduce the manufacturing cost of the hybrid power filter.

SUMMARY OF THE INVENTION

The primary objective of this invention is to provide a power converter for a hybrid power filter. The power converter permits a power line of a power system to directly connect or connect through a passive power filter to a positive or negative terminal of a DC side of the power converter for free control of an arm of power electronic switches. When the power converter is applied to a single-phase power system, only a single-arm configuration for a power electronic switch set (i.e. two power electronic switches) of the power converter is required. When the power converter is applied to a three-phase, three-wire power system, only a double-arm configuration for the power electronic switch set (i.e. four power electronic switches) of the power converter is required. When the power converter is applied to a three-phase, four-wire power system, only a triple-arm configuration for the power electronic switch set (i.e. six power electronic switches) of the power converter is required. Consequently, the preferred power converter structure can reduce the number of the power electronic switches used therein.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings wherein.

DETAILED DESCRIPTION OF THE INVENTION

Figure 1:
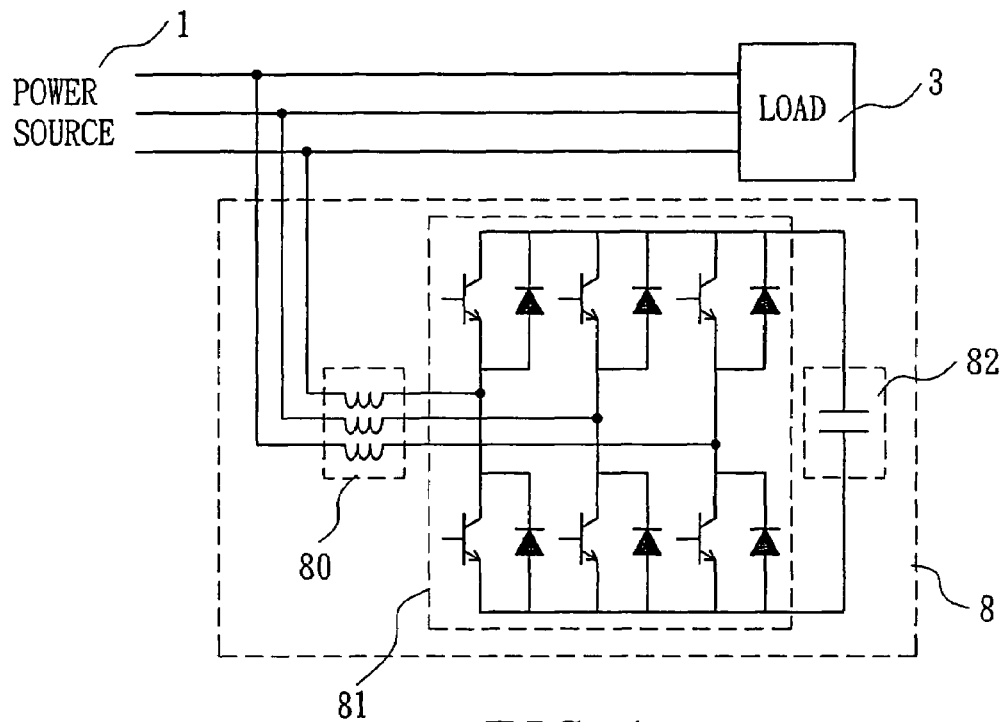
FIG. 1 is a schematic circuitry of a conventional active power filter in accordance with the prior art.
Figure 2:
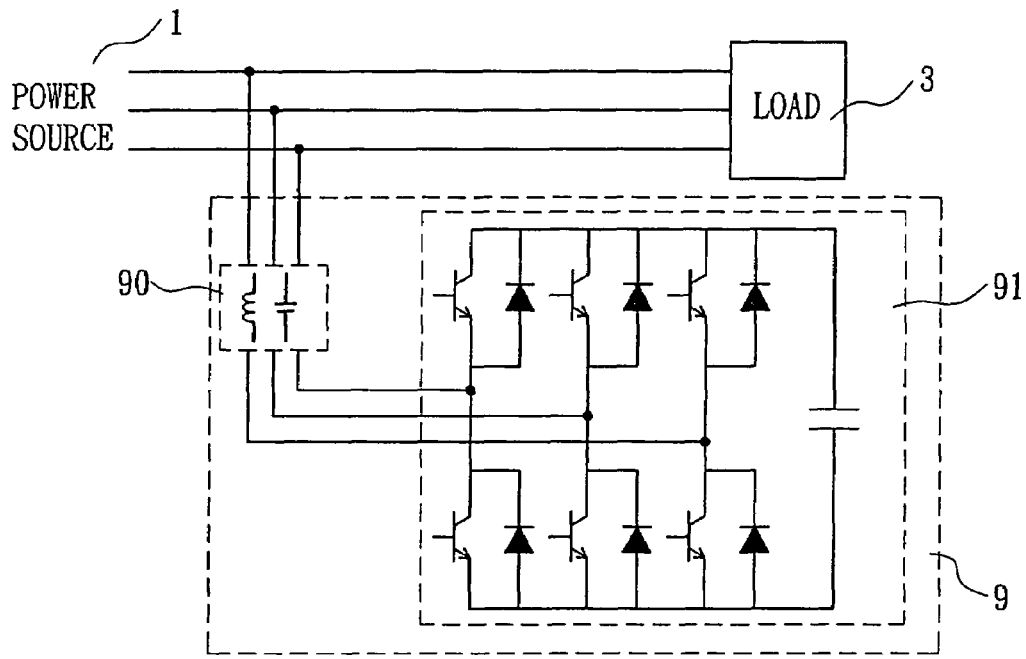
FIG. 2 is a schematic circuitry of a conventional hybrid power filter in accordance with the prior art.
Figure 3:
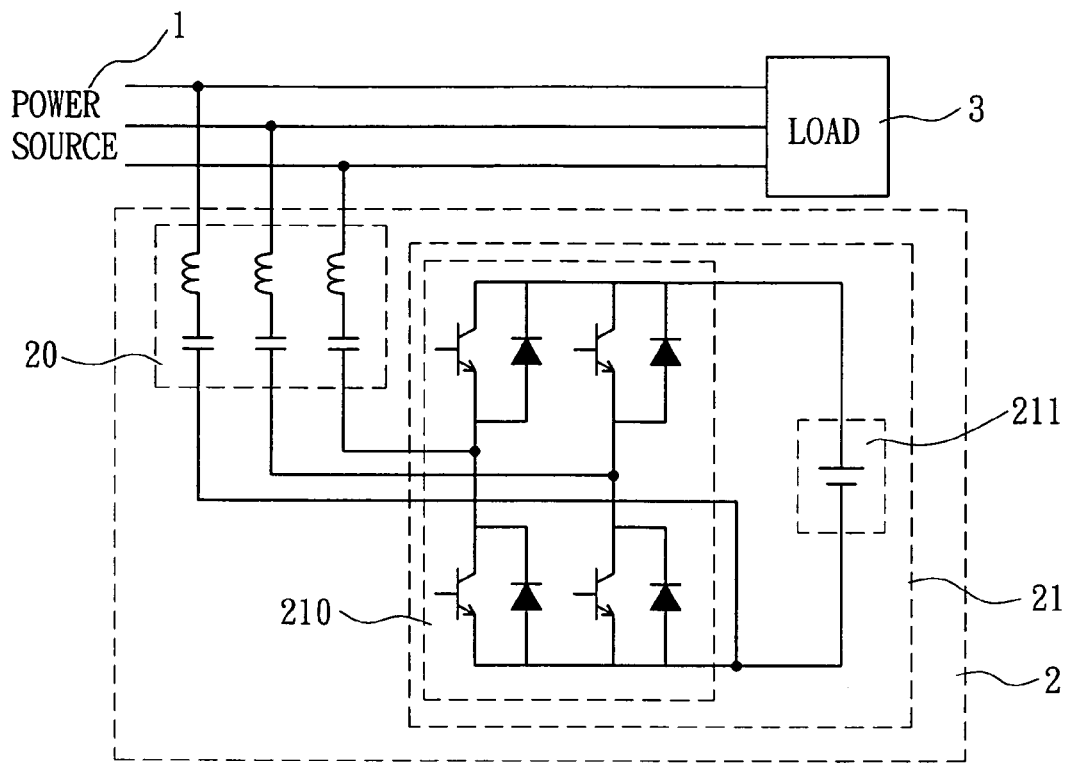
FIG. 3 is a schematic circuitry of a power converter of a hybrid power filter in accordance with a first embodiment of the present invention applied to a three-phase, three-wire power system.

FIG. 3 schematically illustrates the circuitry of a power converter of a hybrid power filter in accordance with a first embodiment of the present invention applied to a three-phase, three-wire power system. A power source 1 of the three-phase, three-wire power system supplies a three-phase, three-wire power to a load 3. A hybrid power filter 2 electrically connects to the load 3 in parallel, and filters harmonic currents generated from the load 3.

Referring again to FIG. 3, in the illustrated first embodiment, the hybrid power filter 2 is applied to the three-phase, three-wire power system. Generally, the hybrid power filter 2 consists of a passive power filter 20 and a power converter 21 serially connected thereto. The passive power filter 20 includes one or more three-phase single-tuned harmonic filter connected to each other. The single-tuned harmonic filter consists of an inductor and an AC capacitor. The three-phase single-tuned harmonic filter is selectively tuned to a major harmonic frequency of the load 3. The passive power filter 20 is used to lower the power capacity of the power converter 21.

Still referring again to FIG. 3, the power converter 21 includes a power electronic switch set 210 and a DC capacitor 211. The power converter 21 is used to improve the filtering effect of the passive power filter 20, and to protect the passive power filter 20 from damage due to resonance and the injection of neighboring harmonic current. The power electronic switch set 210 has a double-arm bridge configuration, each arm of which includes a pair of power electronic switches. The power electronic switch consists of a power switching device (such as IGBT and power MOSFET) and a diode. The double-arm bridge configuration for the power electronic switch set 210 contains a pair of DC terminals and a pair of AC terminals. A connection point between the two power electronic switches of each arm of the bridge configuration is regarded as one of the two AC terminals. The other two terminals of the bridge configuration are the two DC terminals. Connected between the two DC terminals of the power electronic switch set 210 is the DC capacitor 211 regarded as an energy buffer capacitor which accumulates a DC voltage for normal operation of the power converter 21.

Each phase of the passive power filter 20 is provided with the AC capacitor which can effectively block the DC current from the power converter 21. Accordingly, when the power converter 21 is applied to the three-phase, three-wire power system, only the double-arm bridge configuration for the power electronic switch set 210 is required. The power source 1 of the three-phase, three-wire power system includes three power lines, wherein two power lines connect with the two AC terminals of the double-arm bridge configuration of the power electronic switch set 210 via the two phases of passive power filter 20. Alternatively, the other power line of the power source 1 directly connects with a negative terminal of the DC capacitor 211 of the power converter 21 via the other phase of passive power filter 20. In operation, switching the power electronic switch set 210 controls the compensation current supplied from the two phases of the passive power filter 21, which is connected to the two AC terminals of the double-arm bridge configuration of the power electronic switch set 210, to be injected into a power line of the power system.

The sum of three-phase currents of the three-phase, three-wire power system is zero. In the illustrated first embodiment, if the two output phase currents of the hybrid power filter 2 can be controlled to obtain the two accurate compensation currents, it results in the other phase (third phase) of the hybrid power filter 2 supplying an accurate compensation current. The three-phase compensation currents from the hybrid power filter 2 are injected into the three power lines of the three-phase, three-wire power system. Consequently, the three-phase currents supplied from the power source 1 are approximated as nearly sinusoidal waveforms.

Figure 4:
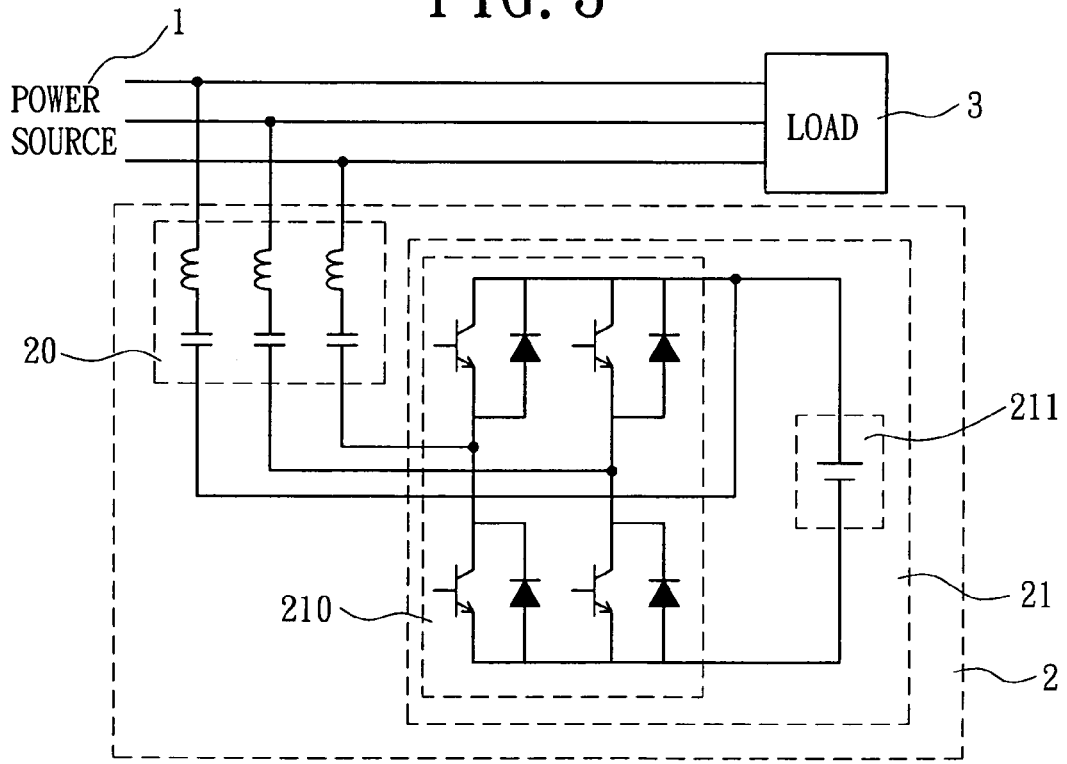
FIG. 4 is a schematic circuitry of a power converter of a hybrid power filter in accordance with a second embodiment of the present invention applied to a three-phase, three-wire power system.

Turning now to FIG. 4, it illustrates a schematic circuitry of a power converter of a hybrid power filter in accordance with a second embodiment of the present invention applied to a three-phase, three-wire power system. Reference numerals of the second embodiment of the present invention have applied the identical numerals of the first embodiment, as shown in FIG. 3. The construction of the hybrid power filter in accordance with the second embodiment of the present invention has similar configuration and same function as that of the hybrid power filter of the first embodiment shown in FIG. 3 and detailed descriptions may be omitted.

Referring to FIG. 4, in the illustrated second embodiment, the AC capacitors of the passive power filter 20 can effectively block the positive or negative DC current from the power converter 21. In comparison with the illustrated first embodiment, one of the power lines of the power source 1 in the illustrated second embodiment directly connects through the one phase of passive power filter 20 to a positive terminal of the DC capacitor 211 of the power converter 21 rather than the negative terminal. As has been discussed in the illustrated first embodiment, the hybrid power filter 2 has one less arm than the conventional three-phase three-wire power converter and therefore one less pair of power electronic switches.

Figure 5:
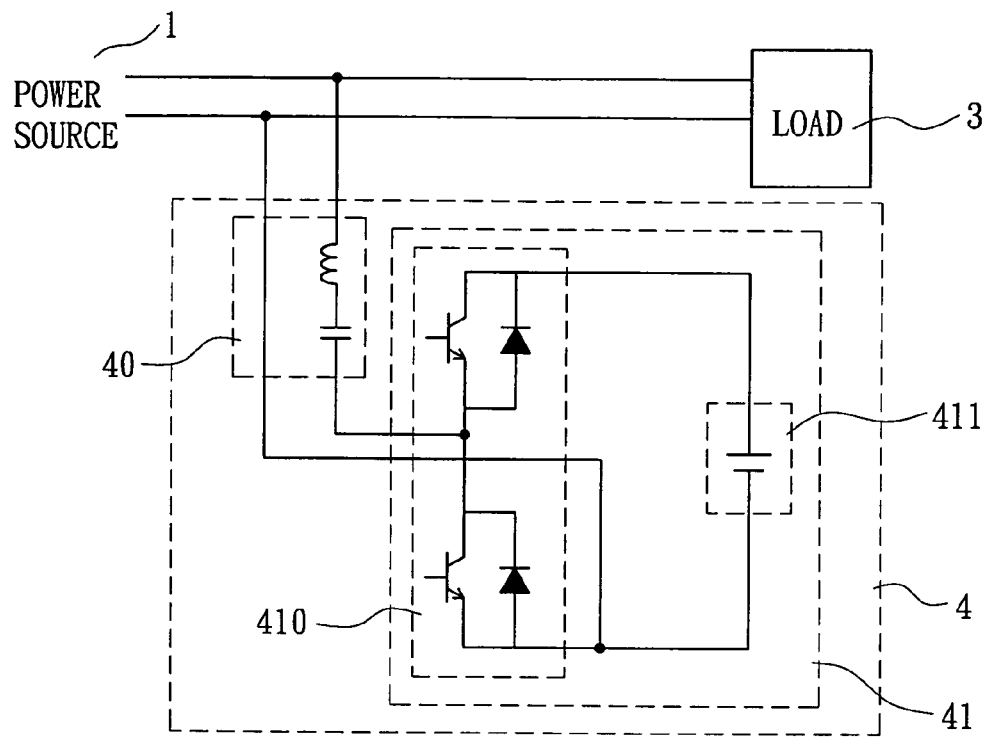
FIG. 5 is a schematic circuitry of a power converter of a hybrid power filter in accordance with the first embodiment of the present invention applied to a single-phase power system.

FIG. 5 schematically illustrates the circuitry of a power converter of a hybrid power filter in accordance with the first embodiment of the present invention applied to a single-phase power system. The power source 1 of the single-phase power system supplies a single-phase power to the load 3. The hybrid power filter 4 electrically connects to the load 3 in parallel, and filters harmonic current generated from the load 3.

Referring again to FIG. 5, in the illustrated first embodiment, the hybrid power filter 4 is applied to the single-phase power system. Generally, the hybrid power filter 4 consists of a passive power filter 40 and a power converter 41 serially connected thereto. The passive power filter 40 includes one or more single-phase single-tuned harmonic filter sets connected each other. The single-tuned harmonic filter consists of an inductor and an AC capacitor. The single-tuned filter is selectively tuned to a major harmonic frequency of the load 3. The passive power filter 40 is used to lower the power capacity of the power converter 41.

Still referring again to FIG. 5, the power converter 41 includes a power electronic switch set 410 and a DC capacitor 411. The power converter 41 is used to improve the filtering effect of the passive power filter 40, and to prevent damage to the passive power filter 40 from resonance and the neighboring harmonic current injection. The power electronic switch set 410 has a single-arm bridge configuration and the arm includes a pair of power electronic switches. The power electronic switch consists of a power switching device (such as IGBT and power MOSFET) and a diode. The single-arm bridge configuration for a power electronic switch set contains a pair of DC terminals and an AC terminal. A connection point between the two power electronic switches of the single-arm bridge configuration is regarded as an AC terminal. The other two terminals of the bridge configuration are the two DC terminals. Connected between the two DC terminals of the power electronic switch set 410 is the DC capacitor 411 acting as an energy buffer capacitor which accumulates a DC voltage for normal operation of the power converter 41.

The passive power filter 40 is provided with the AC capacitor which can effectively block the DC current from the power converter 21. Accordingly, when the power converter 41 is applied to the single-phase power system, only the single-arm bridge configuration for the power electronic switch set 410 is required. The power source 1 of the single-phase power system includes two power lines, wherein one power line connects with the AC terminal of the single-arm bridge configuration of the power electronic switch set 410 via the passive power filter 40. Alternatively, the other power line of the power source 1 directly connects with a negative terminal of the DC capacitor 411 of the power converter 41. In operation, switching the power electronic switch set 410 controls the compensation current from the single phase of the hybrid power filter 4. The compensation current from the hybrid power filter 4 is injected into the power line of the single-phase power system. Consequently, the single-phase current supplied from the power source 1 is approximated as a nearly sinusoidal waveform.

Figure 6:
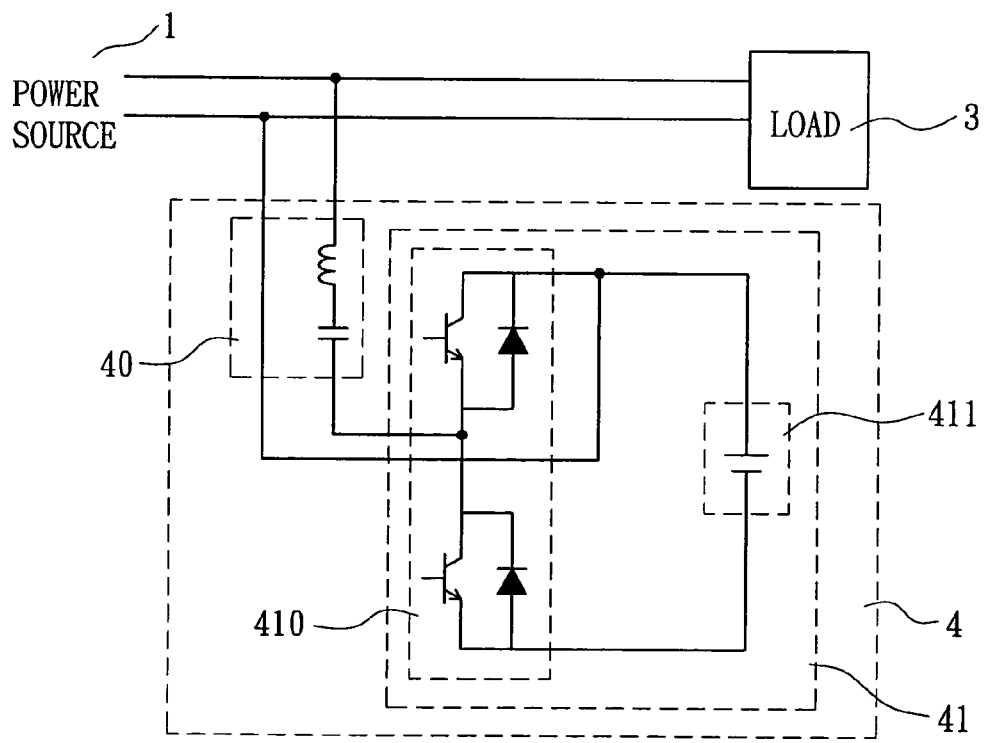
FIG. 6 is a schematic circuitry of a power converter of a hybrid power filter in accordance with the second embodiment of the present invention applied to a single-phase power system.

FIG. 6 schematically illustrates the circuitry of a power converter of a hybrid power filter in accordance with the second embodiment of the present invention applied to a single-phase power system. Reference numerals of the second embodiment of the present invention have applied the identical numerals of the first embodiment, as shown in FIG. 5. The construction of the hybrid power filter in accordance with the second embodiment of the present invention has a similar configuration and same function as that of the hybrid power filter of the first embodiment shown in FIG. 5 and detailed descriptions may be omitted.

Figure 7:
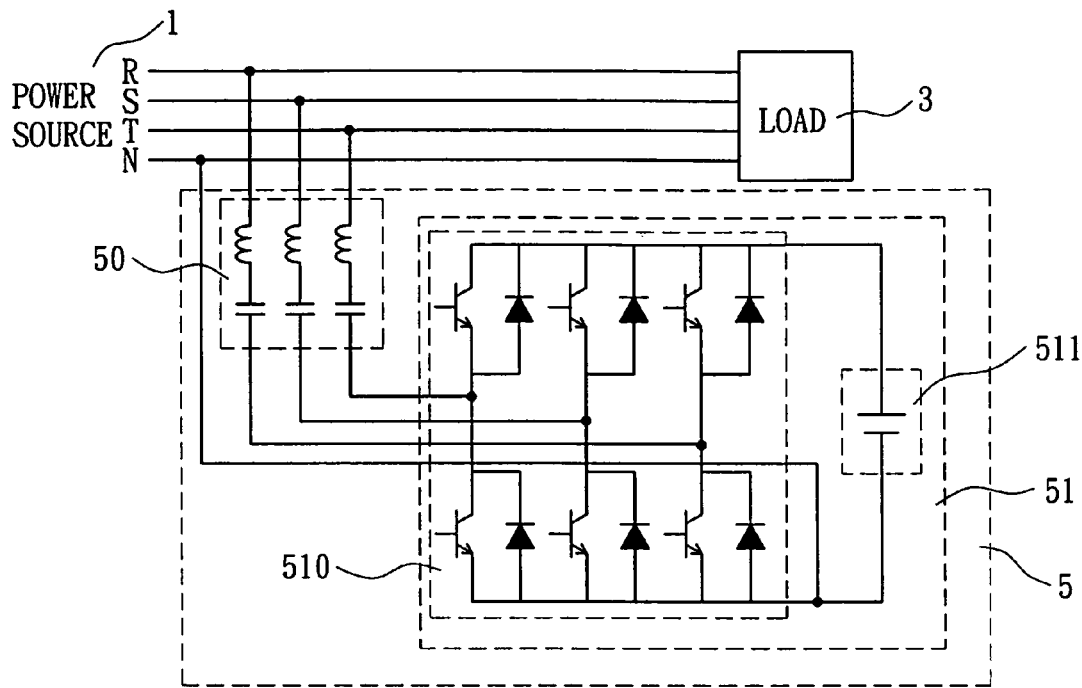
FIG. 7 is a schematic circuitry of a power converter of a hybrid power filter in accordance with the first embodiment of the present invention applied to a three-phase, four-wire power system.

Referring to FIG. 6, in the illustrated second embodiment, the AC capacitors of the passive power filter 40 can effectively block the positive or negative DC current from the power converter 41. In comparison with the illustrated first embodiment, one of the power lines of the power source 1 in the illustrated second embodiment directly connects with a positive terminal of the DC capacitor 411 of the power converter 41 rather than the negative terminal. As mentioned in the discussion of the illustrated first embodiment, the hybrid power filter 4 has one less arm than the conventional single-phase power converter and one less pair of power electronic switches FIG. 7 schematically illustrates the circuitry of a power converter of a hybrid power filter in accordance with the first embodiment of the present invention applied to a three-phase, four-wire power system. A power source 1 of the three-phase, four-wire power system supplies a three-phase, four-wire power to a load 3. The three-phase, four-wire power system includes three power lines R, S, T and a neutral power line N. A hybrid power filter 5 electrically connects to the load 3 in parallel, and filters the harmonic currents generated from the load 3.

Referring again to FIG. 7, in the illustrated first embodiment, the hybrid power filter 5 is applied to the three-phase, four-wire power system. Generally, the hybrid power filter 5 consists of a passive power filter 50 and a power converter 51 serially connected thereto. The passive power filter 50 includes one or more three-phase single-tuned harmonic filters connected each other. The single-tuned harmonic filter consists of an inductor and an AC capacitor. The three-phase single-tuned harmonic filter is selectively tuned to a major harmonic frequency of the load 3. The passive power filter 50 is used to lower the power capacity of the power converter 51.

Still referring again to FIG. 7, the power converter 51 includes a power electronic switch set 510 and a DC capacitor 511. The power converter 51 is used to improve the filtering effect of the passive power filter 50, and to protect the passive power filter 50 from the damage of resonance and the neighboring harmonic current injection. The power electronic switch set 510 has a triple-arm bridge configuration, each arm of which includes a pair of power electronic switches. The power electronic switch consists of a power switching device (such as IGBT and power MOSFET) and a diode. The triple-arm bridge configuration for power electronic switch set contains a pair of DC terminals and three AC terminals. A connection point between the two power electronic switches of each arm of the bridge configuration is regarded as one of the three AC terminals. The other two terminals of the bridge configuration are the two DC terminals. Connected between the two DC terminals of the power electronic switch set 510 is the DC capacitor 511 acting as an energy buffer capacitor which accumulates a DC voltage for normal operation of the power converter 51.

Each phase of the passive power filter 50 is provided with an AC capacitor which can effectively block the DC current from the power converter 21. Accordingly, when the power converter 51 is applied to the three-phase, four-wire power system, only the triple-arm bridge configuration for the power electronic switch set 510 is required. The power source 1 of the three-phase, four-wire power system includes three power lines R, S, T and a neutral power line N. Three of the power lines R, S, T connect with the three AC terminals of the triple-arm bridge configuration of the power electronic switch set 510 via the passive power filter 50.

Alternatively, the neutral power line N directly connects with a negative terminal of the DC capacitor 511. In operation, switching the power electronic switch set 510 controls accurately the three-phase compensation currents from the hybrid power filter 5. The sum of three-phase currents of the three-phase, three-wire power system is the current of the neutral line. In the illustrated first embodiment, if the three phases of the hybrid power filter 5 can be controlled to obtain the three accurate compensation currents, it results in the neutral power line of the hybrid power filter 5 supplying an accurate compensation current. The three-phase compensation currents from the hybrid power filter 5 are injected into the three-phase, four-wire power system. Consequently, the three-phase currents supplied from the power source 1 are approximated as nearly sinusoidal waveforms.

Figure 8:
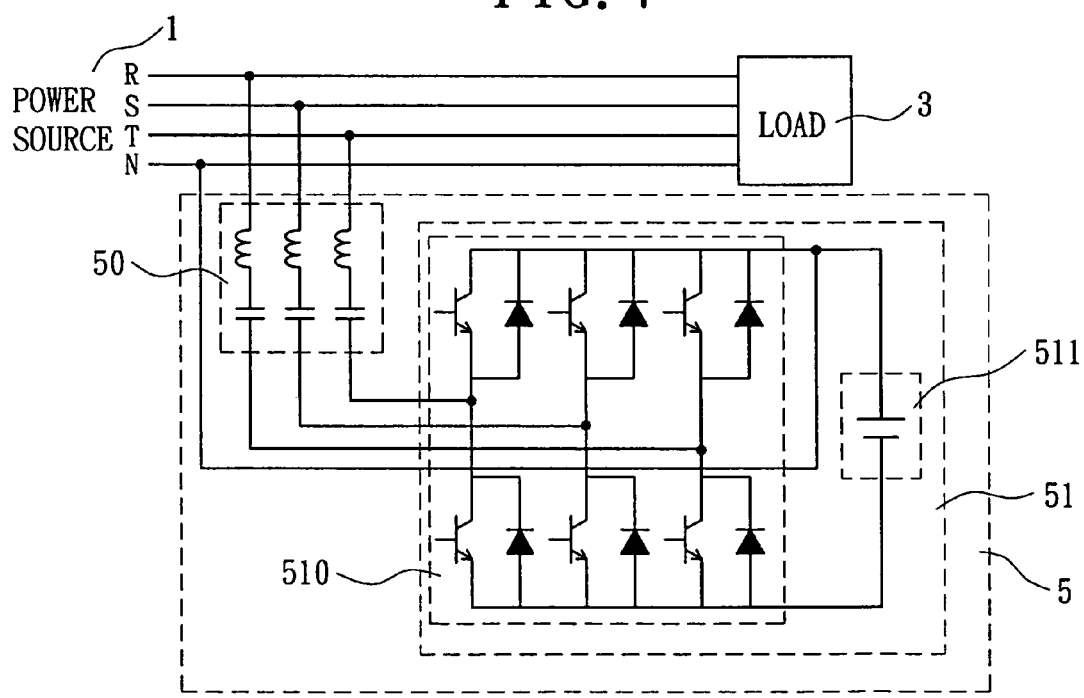
FIG. 8 is a schematic circuitry of a power converter of a hybrid power filter in accordance with the second embodiment of the present invention applied to a three-phase, four-wire power system.

FIG. 8 schematically illustrates the circuitry of a power converter of a hybrid power filter in accordance with the second embodiment of the present invention applied to a three-phase, four-wire power system. Reference numerals of the second embodiment of the present invention are identical to corresponding reference numerals of the first embodiment, as shown in FIG. 7. The construction of the hybrid power filter in accordance with the second embodiment of the present invention has similar configuration and same function as that of the hybrid power filter of the first embodiment shown in FIG. 7 and detailed descriptions may be omitted.

Referring to FIG. 8, in the illustrated second embodiment, the AC capacitors of the passive power filter 50 can effectively block the positive or negative DC current from the power converter 21. In comparison with the illustrated first embodiment, the neutral power line of the power source 1 in the illustrated second embodiment directly connects with a positive terminal of the DC capacitor 511 of the power converter 51 rather than the negative terminal. As has been discussed in the illustrated first embodiment, the hybrid power filter 5 has one less arm than the conventional power converter and one less pair of power electronic switches.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A hybrid power filter parallel connecting to a power system, the hybrid power filter comprising a passive power filter and a power converter serially connected thereto, said power converter comprising:

a power electronic switch set having a bridge configuration provided with one or more arms according to the power system; and a DC capacitor acting as an energy buffer to supply the power electronic switch with a DC voltage;

wherein one power line of the power system directly connects or connects through the passive power filter to a terminal of the DC capacitor that permits one arm of the power electronic switch set to be omitted;

wherein switching the power electronic switch set controls a compensation current supplied from the hybrid power filter to be injected into the power line of the power system for eliminating harmonic currents, thereby currents supplied from the power system being approximated as a nearly sinusoidal waveform.

2. The hybrid power filter as defined in claim 1, wherein each arm of the power electronic switch set consists of a pair of power electronic switches, and a connection point between the two power electronic switches is regarded as an AC terminal.

3. The hybrid power filter as defined in claim 1, wherein when the power converter is applied to a three-phase, three-wire power system provided with three power lines, a double-arm configuration for the power electronic switch set of the power converter is provided.

4. The hybrid power filter as defined in claim 3, wherein the two power lines of the three-phase, three-wire power system connect with two AC terminals of the double-arm bridge configuration of the power electronic switch set via the two phases of passive power filter; alternatively, the other power line of the three-phase, three-wire power system directly connects through the other phase of passive power filter to a negative terminal of the DC capacitor of the power converter.

5. The hybrid power filter as defined in claim 3, wherein the two power lines of the three-phase, three-wire power system connect with two AC terminals of the double-arm bridge configuration of the power electronic switch set via the two phases of passive power filter; alternatively, the other power line of the three-phase, three-wire power system connects through the other phase of passive power filter to a positive terminal of the DC capacitor of the power converter.

6. The hybrid power filter as defined in claim 1, wherein when the power converter is applied to a single-phase power system provided with two power lines, a single-arm configuration for the power electronic switch set of the power converter is provided.

7. The hybrid power filter as defined in claim 6, wherein one of the power line of the single-phase power system connects with an AC terminal of the single-arm bridge configuration of the power electronic switch set via the passive power filter; alternatively, the other power line of the single-phase power system directly connects with a negative terminal of the DC capacitor of the power converter.

8. The hybrid power filter as defined in claim 6, wherein one of the power line of the single-phase power system connects with an AC terminal of the single-arm bridge configuration of the power electronic switch set via the passive power filter; alternatively, the other power line of the single-phase power system directly connects with a positive terminal of the DC capacitor of the power converter.

9. The hybrid power filter as defined in claim 1, wherein when the power converter is applied to a three-phase, four-wire power system provided with three-phase power lines and a neutral power line, a triple-arm configuration for the power electronic switch set of the power converter is provided.

10. The hybrid power filter as defined in claim 9, wherein the three-phase power lines of the three-phase, four-wire power system connect with three AC terminals of the triple-arm bridge configuration of the power electronic switch set via the passive power filter; alternatively, the neutral power line of the three-phase, four-wire power system directly connects with a negative terminal of the DC capacitor.

11. The hybrid power filter as defined in claim 9, wherein the three-phase power lines of the three-phase, four-wire power system connect with three AC terminals of the triple-arm bridge configuration of the power electronic switch set via the passive power filter; alternatively, the neutral power line of the three-phase, four-wire power system directly connects with a positive terminal of the DC capacitor.

* * * * *

UNITED STATES PATENT AND TRADEMARK OFFICE
CERTIFICATE OF CORRECTION

| | | |
|---|---|---|
| PATENT NO. | : 7,272,026 B2 | Page 1 of 1 |
| APPLICATION NO. | : 11/044025 | |
| DATED | : September 18, 2007 | |
| INVENTOR(S) | : Hung-Liang Chou et al. | |

It is certified that error appears in the above-identified patent and that said Letters Patent is hereby corrected as shown below:

On the Title page, Item (73) Assignee
Please change the assignee listed on the first page of the above-identified patent from "UIS Abler Electronics Co., Ltd." to --Ablerex Electronics Co., Ltd.--.

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,272,026 B2 | Page 1 of 1 |
| APPLICATION NO. | : 11/044025 | |
| DATED | : September 18, 2007 | |
| INVENTOR(S) | : Hung-Liang Chou et al. | |

It is certified that error appears in the above-identified patent and that said Letters Patent is hereby corrected as shown below:

This certificate supersedes the Certificate of Correction issued November 18, 2008. The certificate should be vacated since petition under 3.81(b) was granted to change the assignee listed for this patent number.

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,272,026 B2  Page 1 of 1
APPLICATION NO. : 11/044025
DATED : September 18, 2007
INVENTOR(S) : Hung-Liang Chou et al.

It is certified that error appears in the above-identified patent and that said Letters Patent is hereby corrected as shown below:

Title Page, Item (73) Assignee,
Please change the assignee of the above-identified patent from
"UIS Abler Electronics Co., Ltd." to --Ablerex Electronics Co., Ltd.--.

Signed and Sealed this

Twenty-sixth Day of January, 2010

David J. Kappos
*Director of the United States Patent and Trademark Office*